US012774754B2

(12) United States Patent
Phillips et al.

(10) Patent No.: US 12,774,754 B2
(45) Date of Patent: Oct. 27, 2026

(54) CHOKE VALVE INSERT WITH SEAL ASSEMBLY

(71) Applicant: FMC Technologies, Inc., Houston, TX (US)

(72) Inventors: Ryan Phillips, Houston, TX (US); John Calder, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 10 days.

(21) Appl. No.: 18/938,194

(22) Filed: Nov. 5, 2024

(65) Prior Publication Data

US 2026/0126123 A1 May 7, 2026

(51) Int. Cl.
*F16K 25/02* (2006.01)
*F16K 3/24* (2006.01)

(52) U.S. Cl.
CPC .............. *F16K 25/02* (2013.01); *F16K 3/243* (2013.01); *F16K 3/246* (2013.01)

(58) Field of Classification Search
CPC .......... F16K 25/02; F16K 3/243; F16K 3/246; F16K 3/0227; F16K 3/0237
See application file for complete search history.

(56) References Cited

U.S. PATENT DOCUMENTS 3,892,384 A * 7/1975 Myers ....................... F16K 1/44
251/282
5,791,657 A 8/1998 Cain et al.
11,644,107 B2 5/2023 Linder et al.
2009/0095934 A1 4/2009 Cain et al.
2013/0161553 A1 6/2013 Hunter
2014/0183392 A1 7/2014 Hunter et al.
2015/0226338 A1 * 8/2015 Hunter .................... F16K 41/08
251/330
2020/0088306 A1 3/2020 Haro-Valdez et al.

FOREIGN PATENT DOCUMENTS

FR 2704042 A1 10/1994

OTHER PUBLICATIONS

International Search Report and Written Opinion issued in international patent application No. PCT/US2025/052716, mailed on Feb. 26, 2026 (18 pages).

* cited by examiner

*Primary Examiner* — Daphne M Barry
(74) *Attorney, Agent, or Firm* — Osha Bergman Watanabe & Burton LLP

(57) ABSTRACT

A disclosed choke valve insert includes a cage, bonnet, valve stem, and seal assembly. The cage has an orifice configured to receive a flow of fluid. The bonnet is disposed superior to the cage and has a stem bore and cavity. The seal assembly is disposed within the cavity and around the stem bore. The seal assembly includes a seal housing, inner seal, and outer seal. The seal housing has an inner slot and outer slot. The inner seal is disposed within the inner slot and configured to prevent a portion of the flow of fluid from leaking superiorly past the inner seal. The outer seal is disposed within the outer slot and configured to allow the portion of the flow of fluid to return to the stem bore inferior to the inner seal when the inner seal fails.

19 Claims, 9 Drawing Sheets

CHOKE VALVE INSERT WITH SEAL ASSEMBLY

BACKGROUND

A choke valve insert is used in various industries to regulate a flow of fluid, such as fluid flowing through a pipeline. Industries may include the oil and gas industry, power generation industry, and water treatment industry. To regulate the flow of fluid, the choke valve insert uses an orifice configured to receive the flow of fluid and a valve stem translatable into and out of the orifice to alter the amount of fluid flowing through the orifice. The altered amount of fluid flowing through the orifice may be such that the fluid has a prescribed flow rate and pressure among other prescribed variables.

As the flow of fluid flows through the choke valve insert, a portion of the flow of fluid may unintentionally leak past an inner seal of the choke valve insert. For example, fluid may unintentionally leak past the inner seal when the choke valve insert experiences vibrations. Fluid that leaks past the inner seal may be trapped and unable to return to the main flow of fluid flowing through the orifice.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a choke valve insert. The choke valve insert includes a cage, bonnet, valve stem, and seal assembly. The cage has an orifice configured to receive a flow of fluid. The bonnet is disposed superior to the cage. The bonnet has a stem bore and cavity. The valve stem is disposed within the stem bore, translatable into and out of the orifice, and configured to regulate the flow of fluid. The seal assembly is disposed within the cavity and around the stem bore. The seal assembly includes a seal housing, inner seal, and outer seal. The seal housing has an inner slot and outer slot. The inner seal is disposed within the inner slot and configured to form a first seal with the valve stem to prevent a portion of the flow of fluid from leaking superiorly past the inner seal. The outer seal is disposed within the outer slot. The outer seal is configured to form a second seal with the bonnet and allow the portion of the flow of fluid that has leaked superiorly past the inner seal to return to the stem bore inferior to the inner seal when the inner seal fails to form the first seal.

In general, in one aspect, embodiments relate to a method. The method includes disposing a choke valve insert within a valve body and receiving, by an orifice of a cage of the choke valve insert, a flow of fluid having a first pressure, where the flow of fluid migrates from the orifice into the stem bore. The method further includes, during a first time, preventing, using the inner seal, the portion of the flow of fluid from leaking superiorly past the inner seal and, during a second time, mitigating, using an inner seal of a seal assembly of the choke valve insert, the portion of the flow of fluid from leaking superiorly past the inner seal. The method still further includes, during a third time, allowing, using a seal housing and an outer seal of the seal assembly, the portion of the flow of fluid that has leaked superiorly past the inner seal to return to the stem bore inferior to the inner seal.

In general, in one aspect, embodiments relate to a seal assembly. The seal assembly includes a seal housing, inner seal, and outer seal. The seal housing has an inner slot and outer slot. The inner seal is disposed within the inner slot and configured to form a first seal with an inner member to prevent a flow of fluid inferior to the inner seal from leaking superiorly past the inner seal. The outer seal is disposed within the outer slot. The outer seal is configured to form a second seal with an outer member and allow the flow of fluid that has leaked superiorly past the inner seal to return inferior to the inner seal when the inner seal fails to form the first seal.

Other aspects and advantages of the claimed subject matter will be apparent from the following description and the appended claims.

DETAILED DESCRIPTION

Embodiments disclosed herein relate to a seal assembly and methods of using the same. The seal assembly may be used in any equipment that receives a flow of fluid that may leak past a seal into other areas of the equipment. In some embodiments, the seal assembly may be disposed within a choke valve insert of a choke valve, where the choke valve insert is configured to regulate a flow of fluid (i.e., the main flow of fluid). As the flow of fluid flows through and is regulated by the choke valve insert, fluid may migrate into a stem bore and unintentionally leak past an inner seal into other areas of the choke valve insert. In some environments, such as a subsea environment, the leaked fluid may have such a high pressure that the leaked fluid may damage the inner seal when the pressure of the main flow of fluid is reduced. Accordingly, fluid may continue to leak past the damaged inner seal to thereby further damage the inner seal. Further, if the choke valve insert experiences, for example, vibrations caused by operating conditions, fluid may leak past the inner seal and be trapped in the choke valve insert with no way to return to the main flow of fluid, which may, in turn, damage the inner seal when the pressure of the main flow of fluid is reduced. Advantageously, the disclosed seal assembly provides a mechanism for fluid that has leaked past the inner seal to return to the main flow of fluid. In doing so, the disclosed seal assembly may protect the inner seal from damage.

Figure 1:
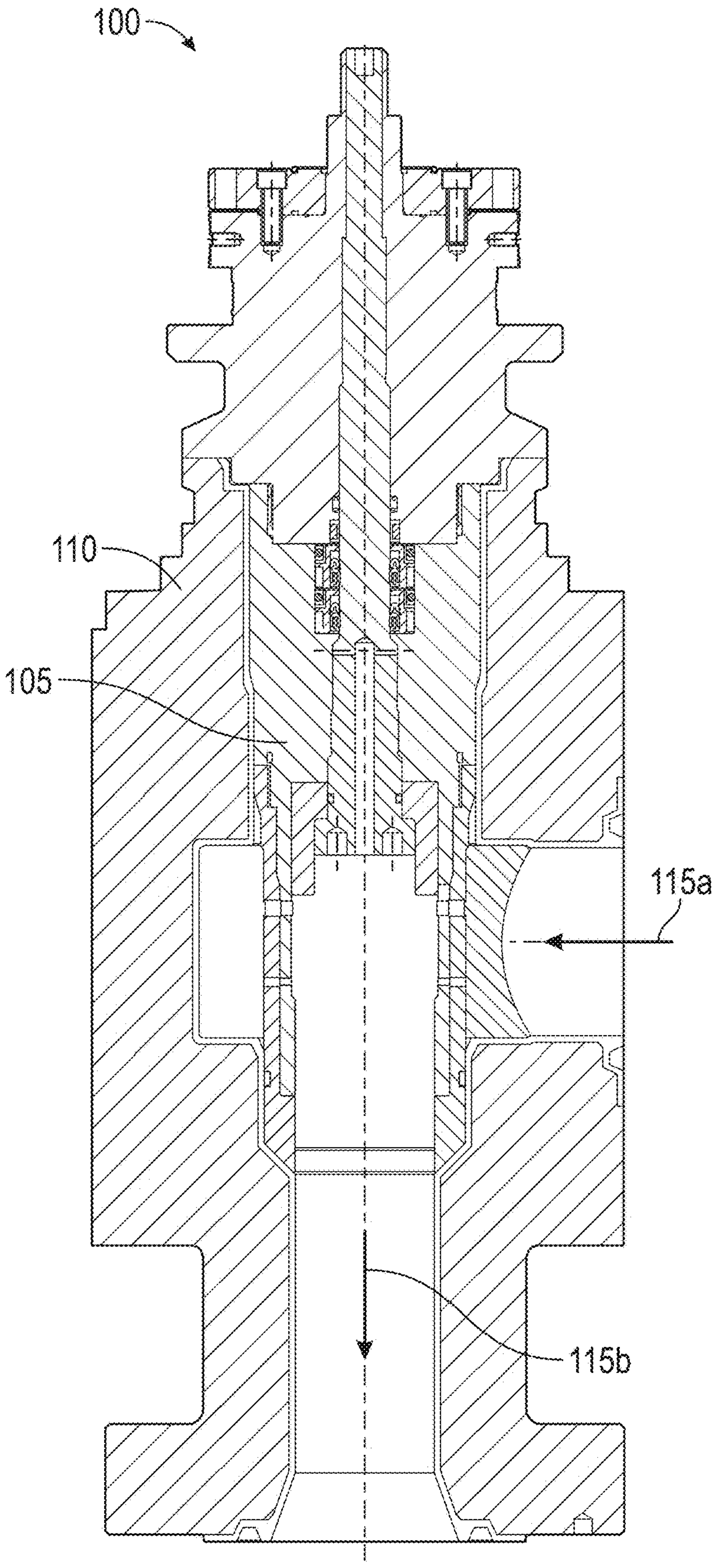
FIG. 1 illustrates a choke valve in accordance with one or more embodiments.

Turning to FIG. 1, FIG. 1 illustrates a choke valve 100 in accordance with one or more embodiments. In some embodiments, the choke valve 100 includes a choke valve insert 105 disposed within a valve body 110. In some embodiments, the choke valve 100 may be disposed along a pipeline or at a wellhead, though neither is shown in FIG. 1.

The flow of fluid flowing through, for example, the pipeline prior to entering the choke valve 100 may be specifically referred to as “upstream fluids” or an “upstream flow of fluid” 115*a*. The flow of fluid flowing through the pipeline after having passed through the choke valve 100 may be specifically referred to as “downstream fluids” or a “downstream flow of fluid” 115*b*. The flow of fluid received by and/or flowing through the choke valve insert 105 of the choke valve 100 may be hereinafter referred to as simply the “fluids” or “flow of fluid.” The flow of fluid flowing through the choke valve insert 105 is the main flow of fluid that the choke valve insert 105 is designed to regulate. That is, the choke valve insert 105 is configured to receive an upstream flow of fluid 115*a*, regulate the flow of fluid, and produce a downstream flow of fluid 115*b* as shown by the arrows in FIG. 1. Hereinafter, the term “fluid” denotes a liquid, gas, or combination thereof. The fluid may be any fluid and is not meant to be limiting.

Though FIG. 1 specifically illustrates an adjustable subsea choke valve known as a plug-and-cage style choke valve, a person of ordinary skill in the art will appreciate that the disclosed seal assembly may be used with other types of choke valves in many types of environments. Other types of choke valves include, without limitation, conventional choke valves, positive choke valves, multi-stage choke valves, automatic choke valves, hydraulic choke valves, etc. Further, a person of ordinary skill in the art will appreciate that the disclosed seal assembly may be disposed within other types of valves or any hardware where reducing pressure damage of a seal may be desirable and/or where a mechanism to return fluid that has leaked past the seal to the main flow of fluid may be desirable.

Figure 2:
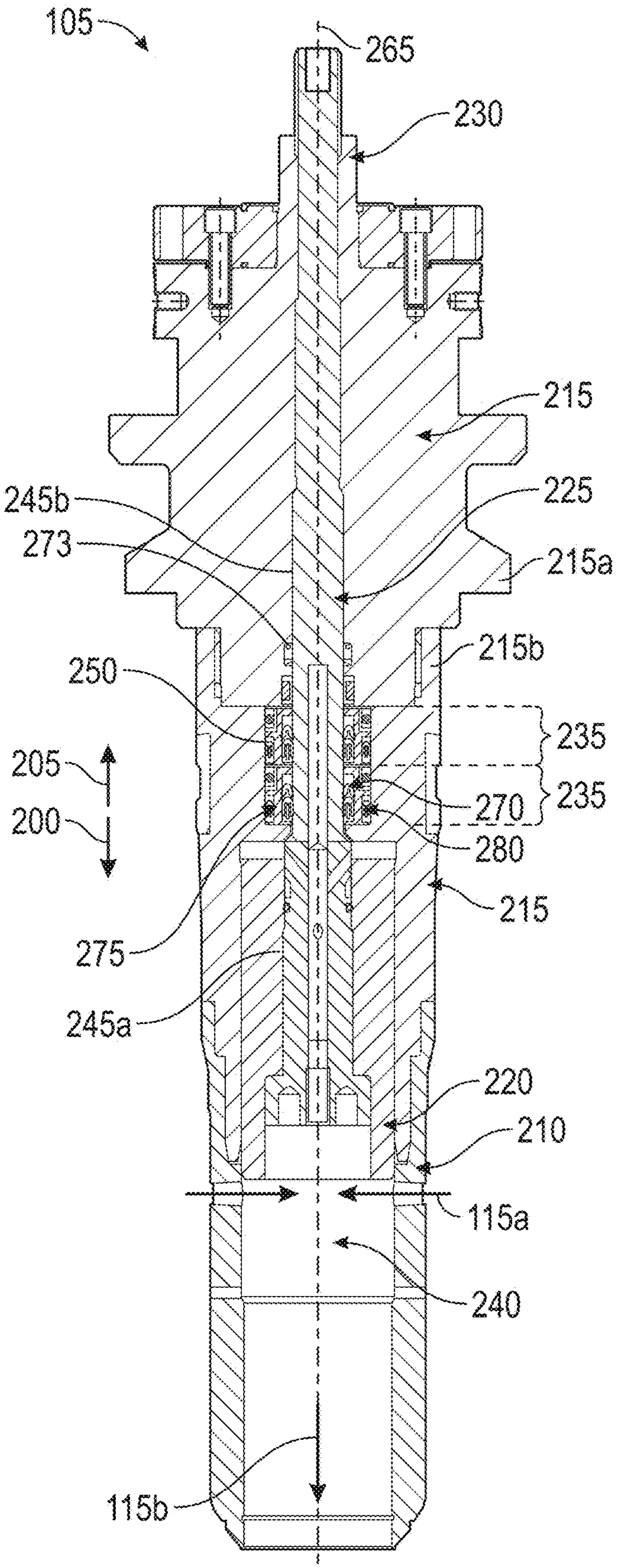
FIG. 2 illustrates a choke valve insert in accordance with one or more embodiments.

Turning to FIG. 2, FIG. 2 illustrates a choke valve insert 105 in accordance with one or more embodiments. Though the choke valve insert 105 is oriented where inferior 200 is down and superior 205 is up, the choke valve insert 105 may be in any orientation when in use.

The choke valve insert 105 may include a cage 210, bonnet 215, plug 220, valve stem 225, drive nut 230, and seal assembly 235 among other parts. The cage 210 has an orifice 240. The orifice 240 is a type of cavity, chamber, or opening. The bonnet 215 is disposed superior 205 to the cage 210. The bonnet 215 may include a bonnet hub 215*a* and bonnet insert 215*b*. Hereinafter, the term “bonnet” generically denotes the bonnet hub 215*a*, bonnet insert 215*b*, or both. Further, the bonnet 215 has a stem bore and cavity 250. Both the stem bore and cavity 250 are types of cavities, chambers, or openings. The stem bore may be separated into a lower stem bore 245*a* and upper stem bore 245*b*. The plug 220 may be fixed to an inferior end of the valve stem 225. The valve stem 225 and/or plug 220 may be disposed, in part, within the stem bore 245*a, b* of the bonnet 215. In some embodiments, the valve stem 225 and/or plug 220 are further disposed, in part, within the orifice 240 of the cage 210. The seal assembly 235 is disposed within the cavity 250 and around the stem bore 245*a, b* of the bonnet 215. Though FIG. 2 illustrates the cavity 250 somewhat centered along the bonnet 215 and open to the stem bore 245*a, b*, the cavity 250 that the seal assembly 235 is disposed within may be along an inferior or superior portion of the bonnet 215 without departing from the scope of the disclosure.

Turning to the function of the choke valve insert 105, the orifice 240 is configured to receive the upstream flow of fluid 115*a* as shown by the arrows in FIG. 2. In some embodiments, the upstream flow of fluid 115*a* is received by the orifice 240 when the upstream flow of fluid 115*a* flows through a collection of holes (not shown) in the cage 210 to thereby enter the orifice 240. However, a person of ordinary skill in the art will appreciate the cage 210 and orifice 240 could be different. Other types of cages 210 and orifices 240 may include, without limitation, cage and external sleeves, needle and seats, and rotating discs.

The drive nut 230 is configured to translate the valve stem 225 and plug 220 within, at least in part, the stem bore 245*a, b* along an axis 265. Translation of the valve stem 225 and plug 220 into the orifice 240 (i.e., inferior 200 along the axis 265) causes the plug 220 to enter, at least in part, the orifice 240 thereby restricting or decreasing the flow of fluid that can flow through the orifice 240. This process may be referred to as “closing the choke valve insert.” Translation of the valve stem 225 and plug 220 out of the orifice 240 (i.e., superior 205 along the axis 265) causes the plug 220 to exit, at least in part, the orifice 240 thereby increasing the flow of fluid that can flow through the orifice 240. This process may be referred to as “opening the choke valve insert.” Accordingly, the valve stem 225 and plug 220 are configured to regulate the flow of fluid by controlling how much fluid flows through the orifice 240. In turn, the downstream flow of fluid 115*b* may flow at a prescribed flow rate and prescribed pressure among other prescribed variables.

As fluid flows through the orifice 240 of the choke valve insert 105, a portion of the flow of fluid may migrate into the lower stem bore 245*a*. However, some of the migrated fluid may further migrate along the lower stem bore 245*a* and unintentionally leak past an inner seal 270 intermittently or continuously. This may occur, for example, if the choke valve insert 105 experiences vibrations or other unwanted effects caused by flow conditions through the choke valve insert 105. Though leakage may occur, the inner seal 270 is designed or configured to form a first seal with the valve stem 225 to thereby prevent the migrated fluid from leaking superiorly past the inner seal 270. Following leakage, the leaked fluid may be trapped within the lower stem bore 245*a* between the inner seal 270 and a hyperbaric seal 273. Note the lower stem bore 245*a* is below the hyperbaric seal 273 and the upper stem bore 245*b* is above the hyperbaric seal 273. Accordingly, the trapped, leaked fluid is unable to return to the main flow of fluid flowing through the orifice 240 of the choke valve insert 105. When the pressure of the main flow of fluid flowing through the orifice 240 is reduced, the pressure differential between the trapped, leaked fluid and the main flow of fluid may damage the inner seal 270 thereby preventing the inner seal 270 from forming a first seal and allowing fluid to continue to leak past the inner seal 270 intermittently or continuously.

Advantageously, the disclosed seal assembly 235 provides a mechanism for the trapped, leaked fluid to return to the lower stem bore 245*a* inferior to the inner seal 270. In some embodiments, the returned, leaked fluid may further return to the main flow of fluid flowing through the orifice 240. In doing so, the pressure of the trapped, leaked fluid may be reduced and the integrity of the inner seal 270 mitigated or maintained (i.e., damage to the inner seal 270 is reduced). Colloquially, the process of reducing the pressure of fluid by releasing some of the fluid may be referred to as “bleeding,” “bleeding pressure,” “burping,” or “burping pressure.” Accordingly, the disclosed seal assembly 235 may reduce general wear and tear and/or damage of the choke valve insert 105 or portions thereof to thereby increase the life of the choke valve insert 105.

FIG. 2 additionally illustrates the disclosed seal assembly 235 disposed within the cavity 250 of the bonnet 215 of the choke valve insert 105. The disclosed seal assembly 235 includes a seal housing 275 and outer seal 280 along with the inner seal 270. The disclosed seal assembly 235 is discussed in detail hereinafter relative to FIGS. 3A-3C, 4A, 4B, 5A, 5B, 6, and 7.

Figure 3A:
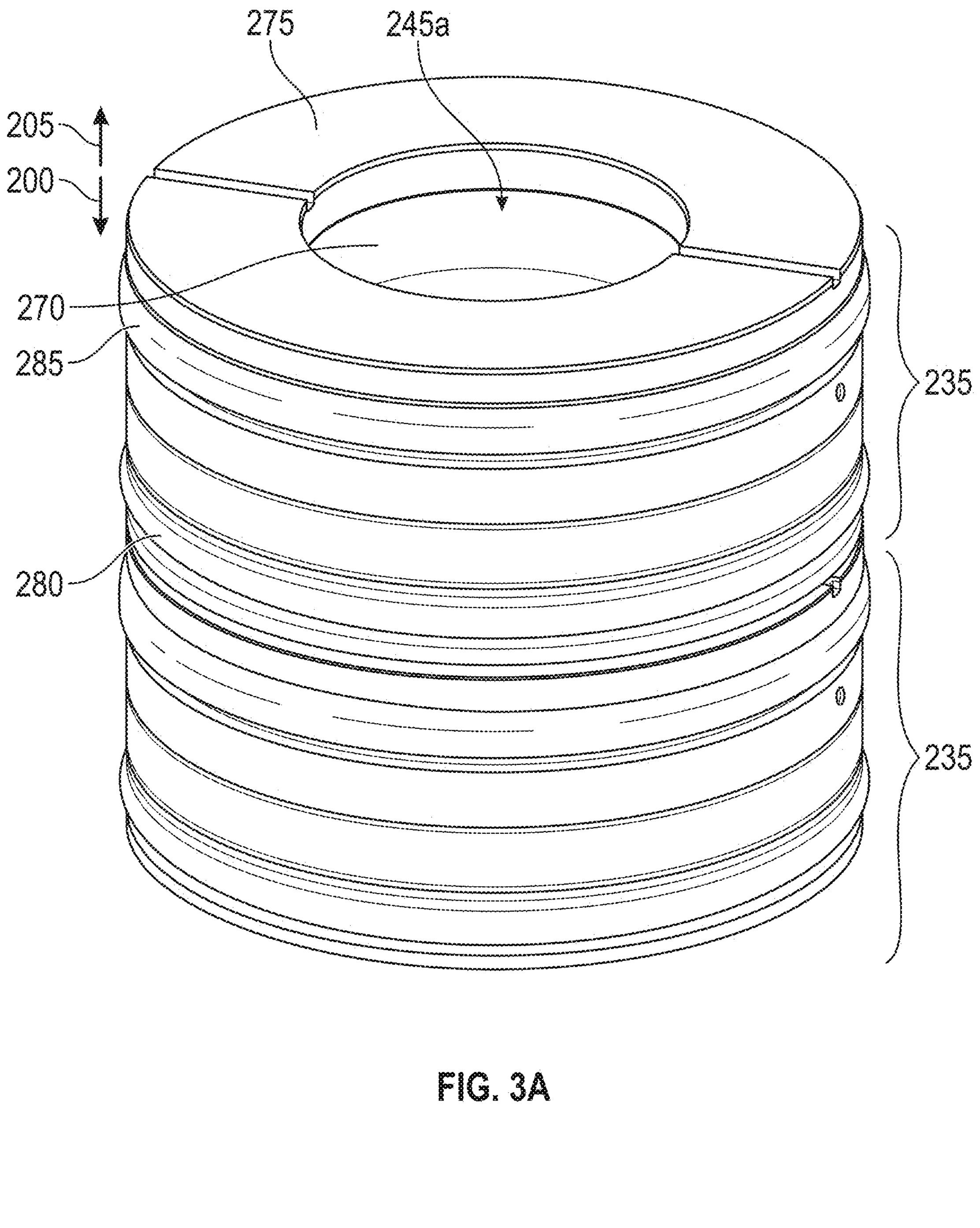
FIGS. 3A-3C illustrate seal assemblies in accordance with one or more embodiments.
Figure 3B:
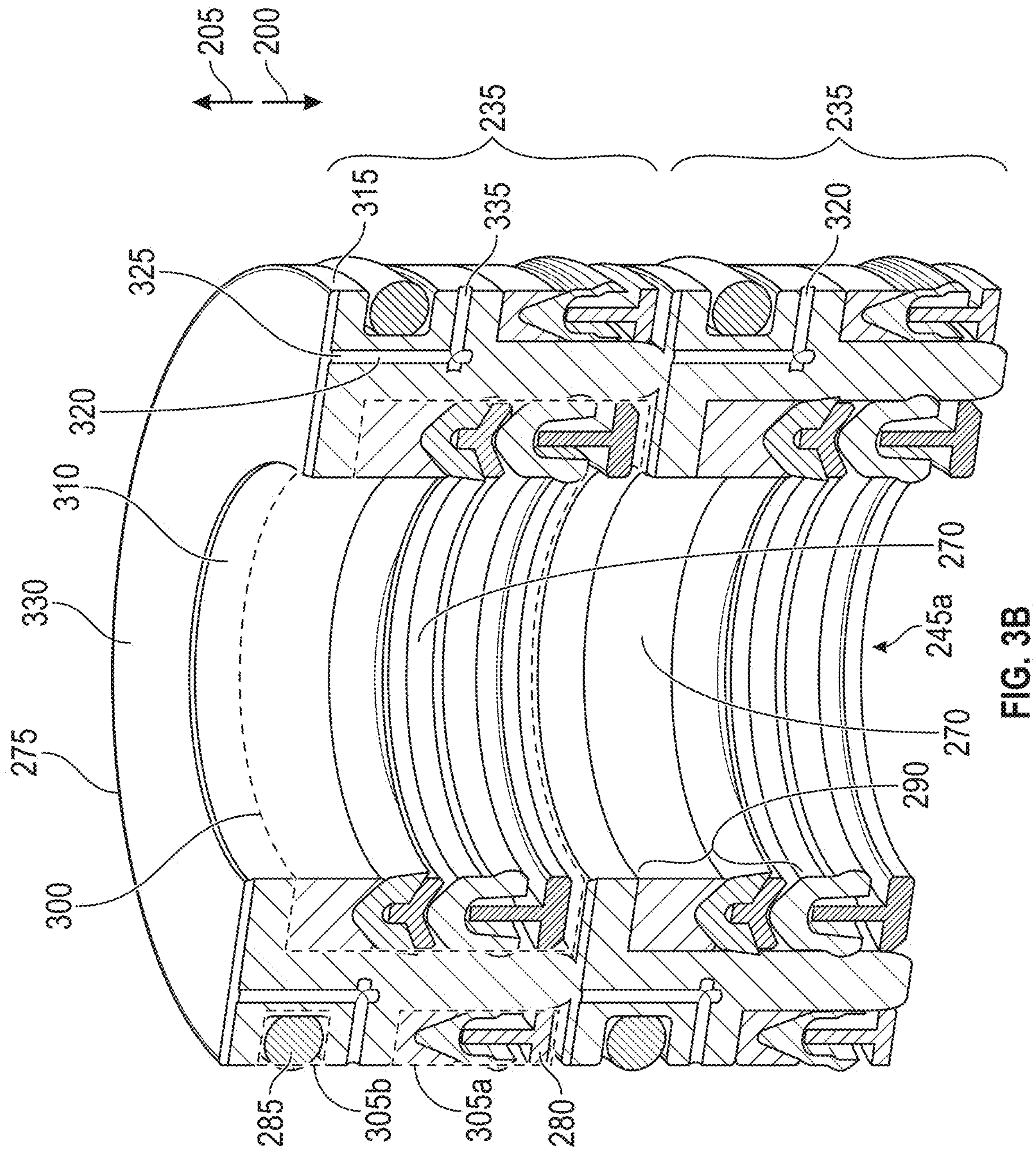
Figure 3C:
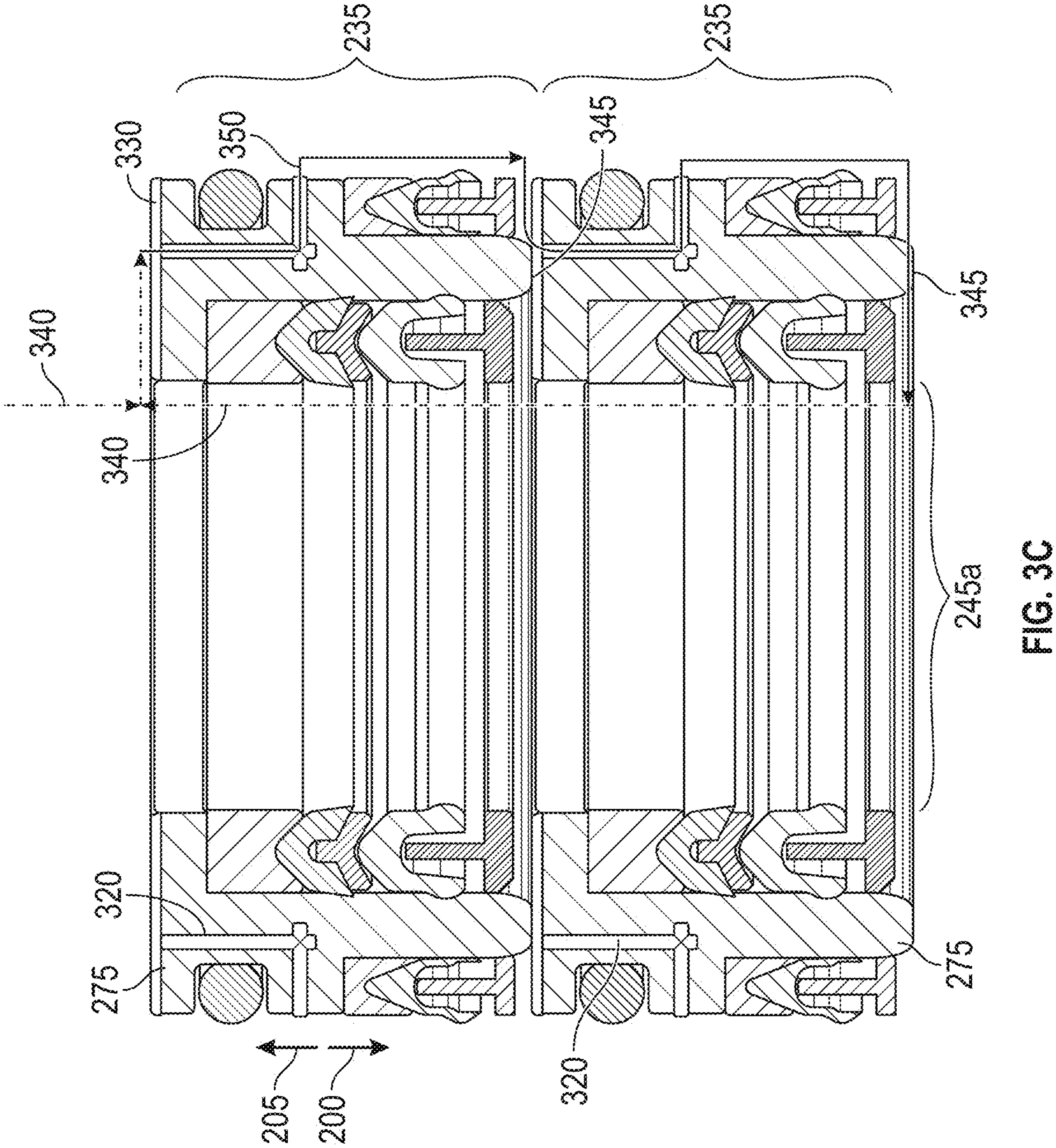

FIGS. 3A-3C illustrate seal assemblies 235 in accordance with one or more embodiments. Specifically, FIGS. 3A-3C illustrate two seal assemblies 235 stacked one on top of another.

FIG. 3A illustrates an isometric view of the two seal assemblies 235 in accordance with one or more embodiments. Each seal assembly 235 includes a seal housing 275, inner seal 270, and outer seal 280. In some embodiments, the seal assembly 235 further includes a dampener 285.

In embodiments where the seal assembly 235 is disposed within a cavity 250 and around a lower stem bore 245*a* of a bonnet 215 of a choke valve insert 105, an inner chamber of the seal assembly 235 forms a portion of the lower stem bore 245*a*. In these embodiments, a valve stem 225 of the choke valve insert 105 may be disposed, in part, within the lower stem bore 245*a*, though not shown in FIG. 3A. Further, in these embodiments, the inner seal 270 is designed or configured to form the first seal with the valve stem 225 (a type of inner member) to prevent fluid from leaking superiorly past the inner seal 270 along the lower stem bore 245*a*. Continuing with these embodiments, the outer seal 280 is configured to form a second seal with the bonnet 215 (a type of outer member) as shown in FIG. 2 though not shown in FIG. 3A.

To further illustrate the seal assemblies 235, FIG. 3B illustrates an isometric view of a cross section of the two seal assemblies 235 illustrated in FIG. 3A. It can now be seen that each seal housing 275 has an inner slot 300 and two outer slots 305*a, b*. The inner slot 300 extends, in part, into the seal housing 275 from an inward-facing inner wall surface 310. The two outer slots 305*a, b* extend, in part, into the seal housing 275 from an outward-facing outer wall surface 315. The inner seal 270 is disposed, at least in part, within the inner slot 300. The outer seal 280 is disposed, at least in part, within the first outer slot 305*a*. The dampener 285 is disposed, at least in part, within the second outer slot 305*b*.

In some embodiments, the inner seal 270 may include a UV-seal system, where "UV" designates the shape of a portion of the UV-seal system as having both a U-shape and V-shape. Further, in some embodiments, the UV-seal system may include a UV-seal 290. In some embodiments, a portion of the UV-seal system and the outer seal 280 may be similar to the sealing assembly disclosed in U.S. Pat. No. 11,644,107. In other embodiments, the outer seal 280 may include an S-seal. The "S" in S-seal designates the shape of the S-seal. The S-seal may be similar to the wellhead seal assembly disclosed in U.S. Pat. No. 5,791,657 and/or the wellhead sealing assembly disclosed in French Patent No. 2,704,042. In some embodiments, the dampener 285 may include an O-ring or S-Seal. FIG. 3B specifically illustrates the inner seal 270 as a UV-seal system that includes a UV-seal 290 and the dampener 285 as an O-ring.

In some embodiments, the seal housing 275 has a channel 320. The channel 320 may extend through the seal housing 275 from a first opening 325 on an upper wall surface 330 of the seal housing 275 to a second opening 335 on the outward-facing outer wall surface 315 of the seal housing 275 such that the channel 320 bypasses or goes around the dampener 285. Though FIG. 3B illustrates the channel 320 as an L-shape, the channel 320 may take any shape without departing from the scope of the disclosure.

FIG. 3C illustrates a side view of the cross section of the two seal assemblies 235 illustrated in FIGS. 3A and 3B. Further, FIG. 3C illustrates one or more paths leaked fluid may take.

The outer seal 280 may be configured to prevent migrated fluid from leaking superiorly past the outer seal 280 and allow the fluid that has leaked superiorly past the inner seal 270 to inferiorly pass the outer seal 280 such that the leaked fluid can return to the lower stem bore 245*a* inferior to the inner seal 270. In other words, the outer seal 280 may be configured to allow for a unidirectional flow of fluid. In some embodiments, the dampener 285 is configured to dampen a vibration and/or centralize the seal assembly 235 or portions thereof.

During a first time, the inner seal 270 may be configured to form the first seal with, for example, the valve stem 225 of the choke valve insert 105 and the outer seal 280 may be configured to form the second seal with, for example, the bonnet 215 of the choke valve insert 105. Accordingly, the inner seal 270 is configured to prevent fluid that has migrated into a lower stem bore 245*a* from leaking superiorly past the inner seal 270 during the first time. Further, in some embodiments, the outer seal 280 may be configured to prevent fluid that has migrated into the lower stem bore 245*a* from leaking superiorly past the outer seal 280 during the first time.

Though the inner seal 270 is designed to form the first seal with the valve stem 225 to prevent migrated fluid from leaking superiorly past the inner seal 270, vibrations or other unwanted effects caused by the harsh conditions the choke valve insert 105 is operating within may cause the inner seal 270 to fail (i.e., not form the first seal) during a second time. Accordingly, the inner seal 270 may only mitigate or even allow the migrated fluid to leak superiorly past the inner seal 270 as shown by dashed arrows 340 in FIG. 3C. Once migrated fluid has leaked superiorly past the inner seal 270, the leaked fluid may flow in any direction along the lower stem bore 245*a* superior to the inner seal 270. During this second time, the outer seal 280 may continue to form the second seal or may intermittently or continuously fail to form the second seal. Further, during this second time, the leaked fluid may be trapped superior to the inner seal 270 and unable to return to the lower stem bore 245*a* inferior to the inner seal 270 let alone return to the main flow of fluid flowing through the orifice 240 of the choke valve insert 105.

The seal housing 275 and outer seal 280 of the seal assembly 235 may be configured to return the trapped, leaked fluid to the lower stem bore 245*a* inferior to the inner seal 270. In some embodiments, the inner seal 270 may also be configured to return the trapped, leaked fluid to the lower stem bore 245*a* inferior to the inner seal 270. In some embodiments, the trapped, leaked fluid may return inferior to the inner seal 270 when the pressure of the flow of fluid flowing through the orifice 240 is reduced to a pressure below the pressure of the trapped, leaked fluid during a third time. Following the reduction of the pressure of the flow of fluid flowing through the orifice 240, the trapped, leak fluid may flow across the upper wall surface 330 of the seal housing 275, through a channel 320 of the seal housing 275, inferiorly past the outer seal 280 within the cavity 250, and flow across a lower wall surface 345 of the seal housing 275 to return to the lower stem bore 245*a* inferior to the inner seal 270 as shown by the solid arrows 350 in FIG. 3C. Accordingly, the outer seal 280 may fail to form the second seal intermittently or continuously during the third time. In other words, the outer seal 280 may bleed or burp the trapped, leaked fluid back to the lower stem bore 245*a* inferior to the inner seal 270. In some embodiments, the inner seal 270 may reform the first seal during the third time and not be damaged by the pressure of the previously trapped, leaked fluid.

However, in other embodiments, the trapped, leaked fluid may take alternate paths back to the lower stem bore 245*a* inferior to the inner seal 270 without departing from the scope of the disclosure. Further, the path of the trapped, leaked fluid may change over time and/or depending on the pressure differential of the trapped, leaked fluid and the main flow of fluid caused by reducing the pressure of the flow of fluid flowing through the orifice 240. Note that each of the first, second, and third times is a period of time and that these time periods may occur in any order and/or be repeated without departing from the scope of the disclosure.

Figure 4B:
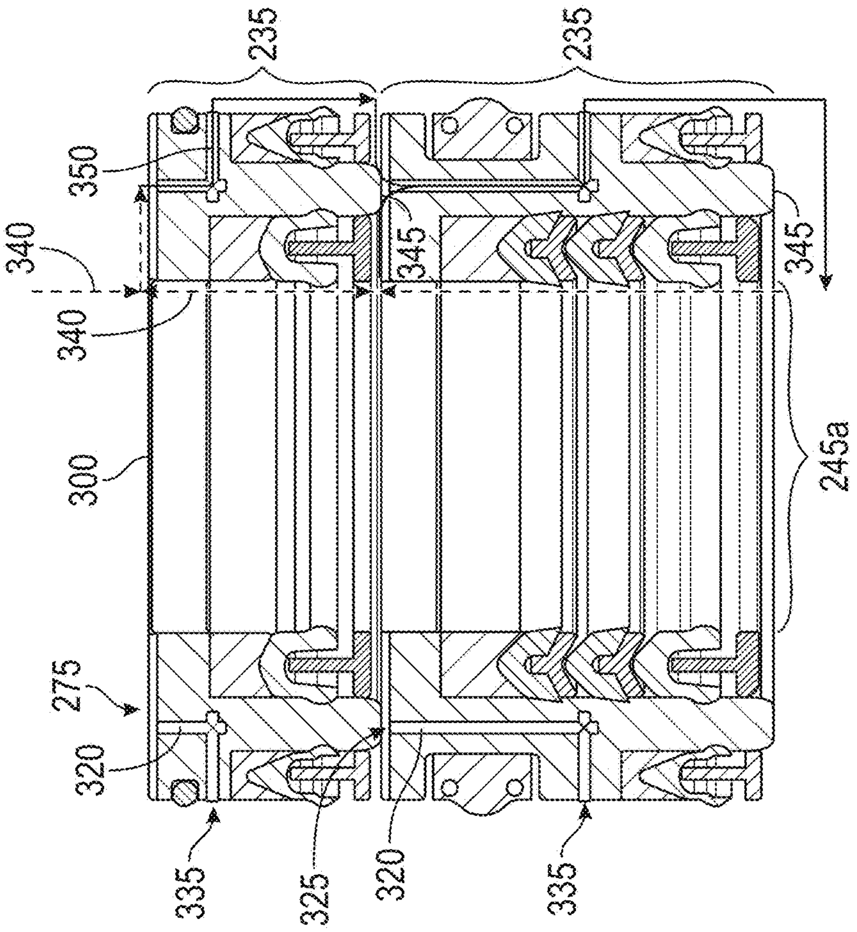
FIGS. 4A and 4B illustrate seal assemblies in accordance with one or more embodiments.
Figure 4A:
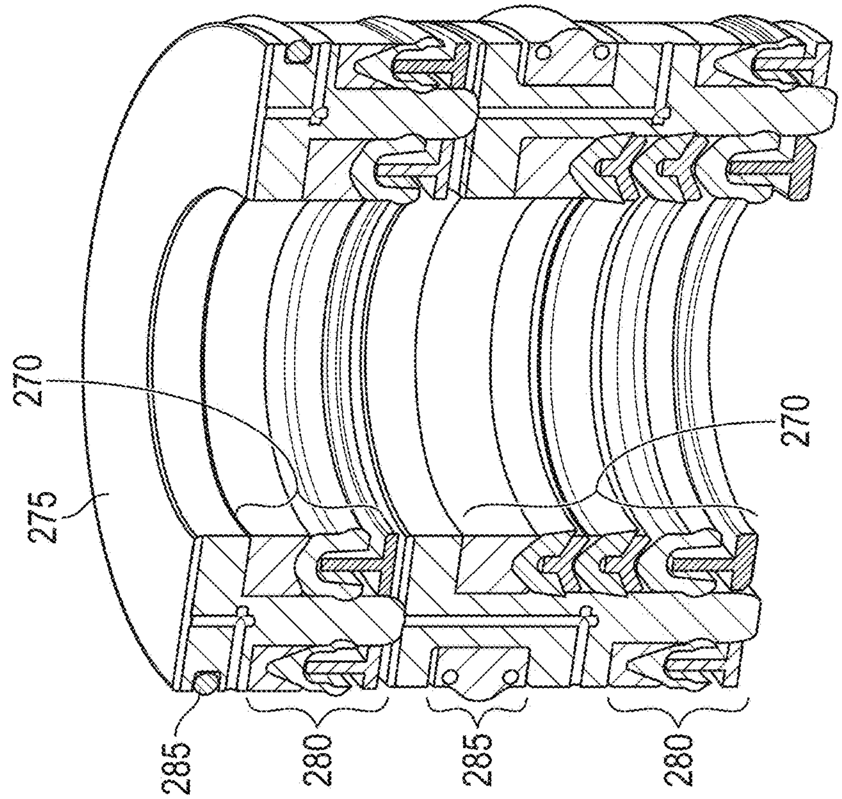

Turning to FIGS. 4A and 4B, FIGS. 4A and 4B illustrate two seal assemblies 235 in accordance with one or more embodiments. FIG. 4A illustrates an isometric view of a cross section of the two seal assemblies 235. FIG. 4B illustrates a side view of the cross section of the two seal assemblies 235.

The superior seal assembly 235 of FIGS. 4A and 4B specifically illustrates the dampener 285 as an O-ring. The inferior seal assembly 235 of FIGS. 4A and 4B specifically illustrates the inner seal 270 as a UV-seal system that includes a UV-seal 290 and the dampener 285 as an S-seal.

In these embodiments, the fluid may follow a similar path as described relative to FIG. 3C. That is, in brief, during a first time, the inner seal 270 may be configured to form the first seal and the outer seal 280 may be configured to form the second seal. During a second time, the inner seal 270 may fail to form the first seal thereby mitigating or allowing migrated fluid to leak superiorly past the inner seal 270 and be trapped as shown by the dashed arrows 340. During a third time, the trapped, leaked fluid may flow through the channel 320 of the seal housing 275 and inferiorly past the outer seal 280 (that no longer forms the second seal) of each seal assembly 235 and back to the lower stem bore 245*a* inferior to the inner seals 270.

However, in other embodiments, because the inner seal 270 of the superior seal assembly 235 illustrated in FIGS. 4A and 4B does not include a UV seal 290, the inner seal 270 may allow for a unidirectional flow of fluid during the third time. Accordingly, trapped, leaked fluid may flow inferiorly past the inner seal 270 of the superior seal assembly 235 that no longer forms the first seal, through the channel 320 of the seal housing 275 of the inferior seal assembly 235, inferiorly past the outer seal 280 of the inferior seal assembly 235 that no longer forms the second seal, and back to the lower stem bore 245*a* inferior to the inner seal 270.

Figure 5B:
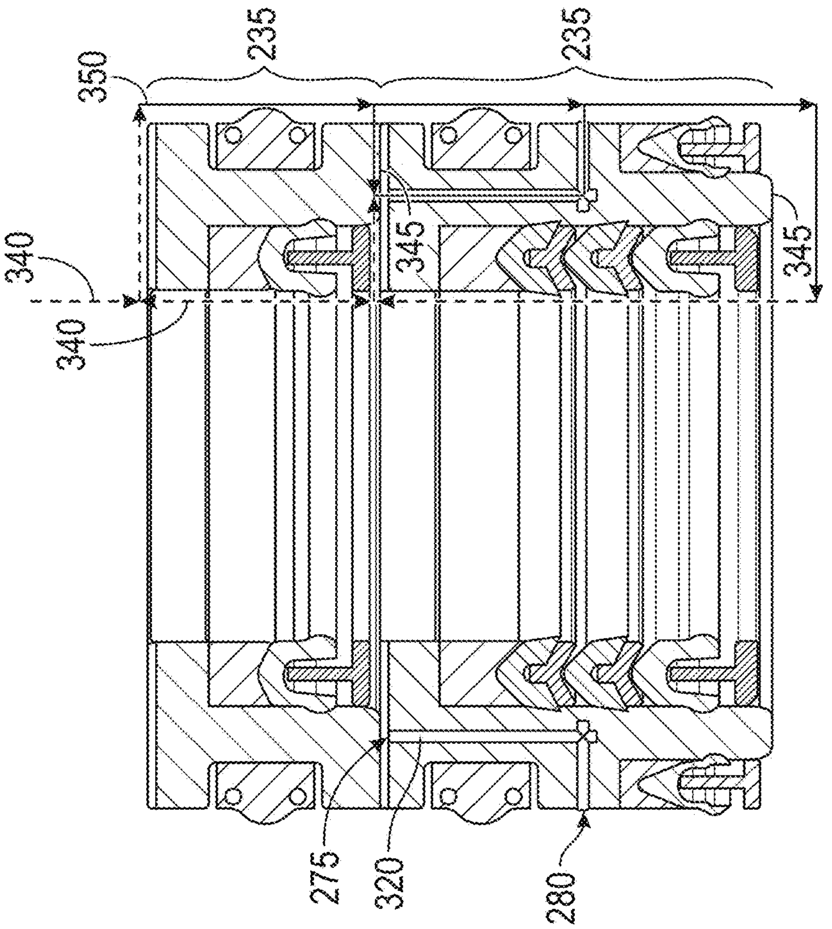
FIGS. 5A and 5B illustrate seal assemblies in accordance with one or more embodiments.
Figure 5A:
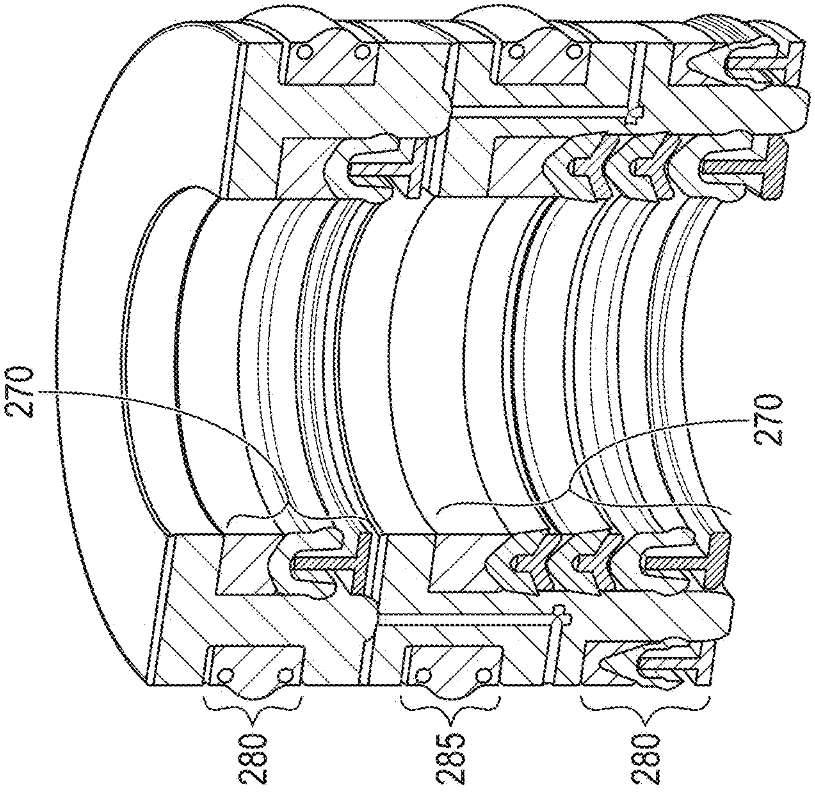

FIGS. 5A and 5B illustrate two seal assemblies 235 in accordance with one or more embodiments. FIG. 5A illustrates an isometric view of a cross section of the two seal assemblies 235. FIG. 5B illustrates a side view of the cross section of the two seal assemblies 235.

The superior seal assembly 235 of FIGS. 5A and 5B specifically illustrates the outer seal 280 as an S-seal. The inferior seal assembly 235 of FIGS. 5A and 5B specifically illustrates the inner seal 270 as a UV-seal system that includes a UV-seal 290 and the dampener 285 as an S-seal.

In some embodiments, trapped, leaked fluid may be trapped superior to the inner seal 270 of the inferior seal assembly 235 and inferior to the inner seal 270 of the superior seal assembly 235. In other embodiments, trapped, leaked fluid may be trapped superior to the inner seal 270 of the superior seal assembly 235 and flow inferiorly past the inner seal 270 of the superior seal assembly 235 that no longer forms the first seal during the third time. Accordingly, in any of these embodiments, during the third time, trapped, leaked fluid may flow between the two seal assemblies 235 before flowing through the channel 320 of the inferior seal assembly 235, inferiorly past the outer seal 280, and back into the lower stem bore 245*a* inferior to the inner seal 270 of the inferior seal assembly 235. FIG. 5B further illustrates alternate paths the trapped, leaked fluid may take.

Figure 6:
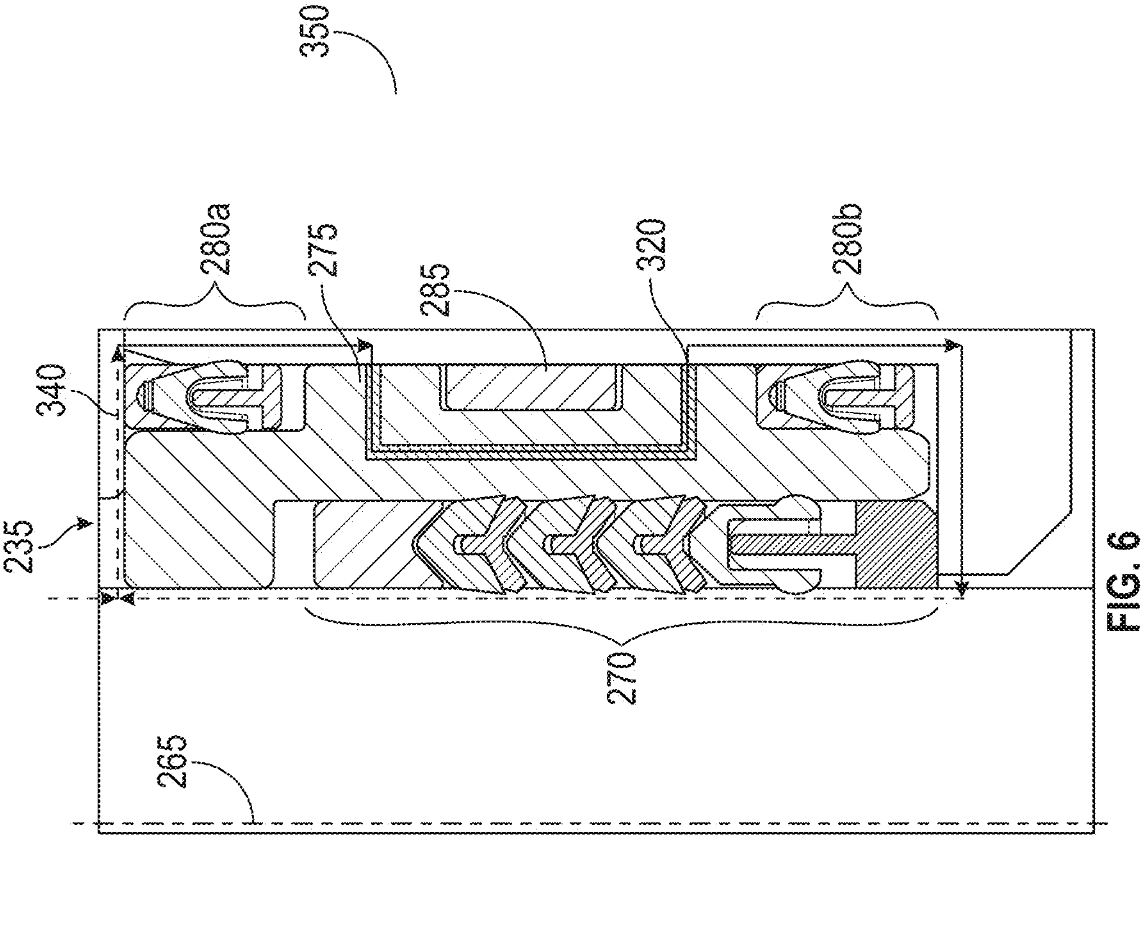

FIG. 6 illustrates a side view of a section of a seal assembly 235 in accordance with one or more embodiments. Note the seal assembly 235 shown is symmetric about the axis 265. In these embodiments, the inner seal 270 is a UV-seal system and the dampener 285 is an O-ring.

In these embodiments, migrated fluid may leak superiorly past the inner seal 270 and be trapped during a second time as shown by the dashed arrows 340 in FIG. 6. During a third time, the trapped, leaked fluid may flow inferiorly past the superior outer seal 280*a*, through the channel 320, and past the inferior outer seal 280*b* before returning to the lower stem bore 245*a* inferior to the inner seal 270 as shown by the solid arrows 350 in FIG. 6.

Figure 7:
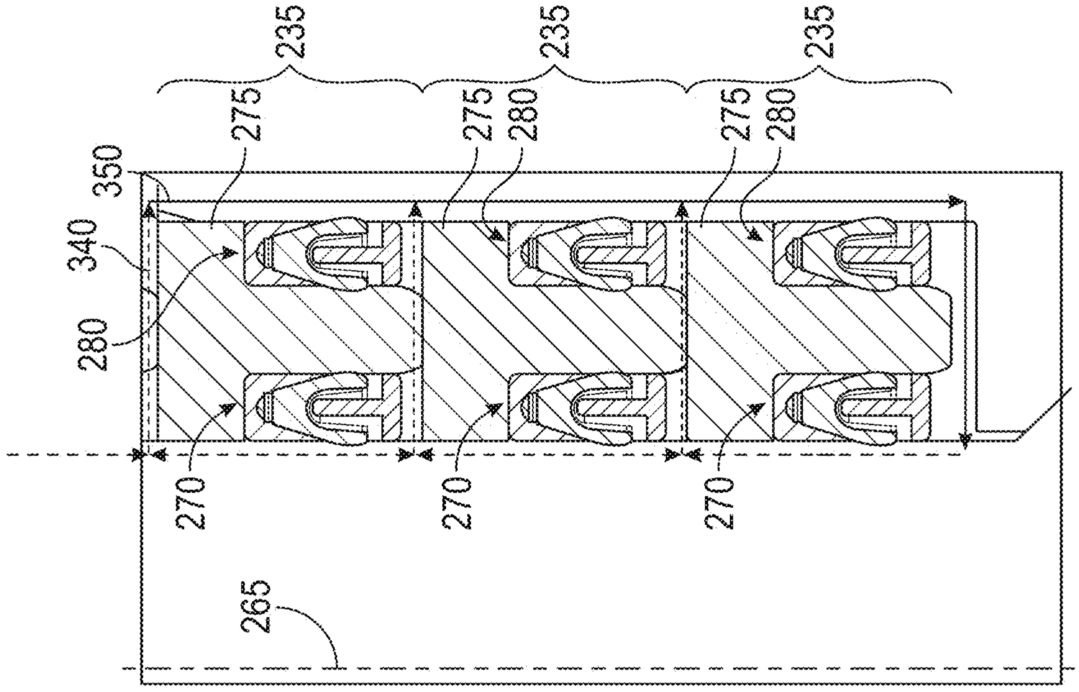
FIGS. 6-7 illustrate seal assemblies in accordance with one or more embodiments.

FIG. 7 illustrates a side view of a section of three seal assemblies 235 in accordance with one or more embodiments. Note the seal assemblies 235 shown are symmetric about the axis 265.

In these embodiments, fluid may leak superiorly past one or more of the inner seals 270 and become trapped superior to one or more of the inner seals 270 during a second time as shown by the dashed arrows 340 in FIG. 7. During a third time, the trapped, leaked fluid may flow past one or more of the outer seals 280 before returning to the lower stem bore 245*a* inferior to the three inner seals 270 as shown by the solid arrows 350 in FIG. 7.

Figure 8:
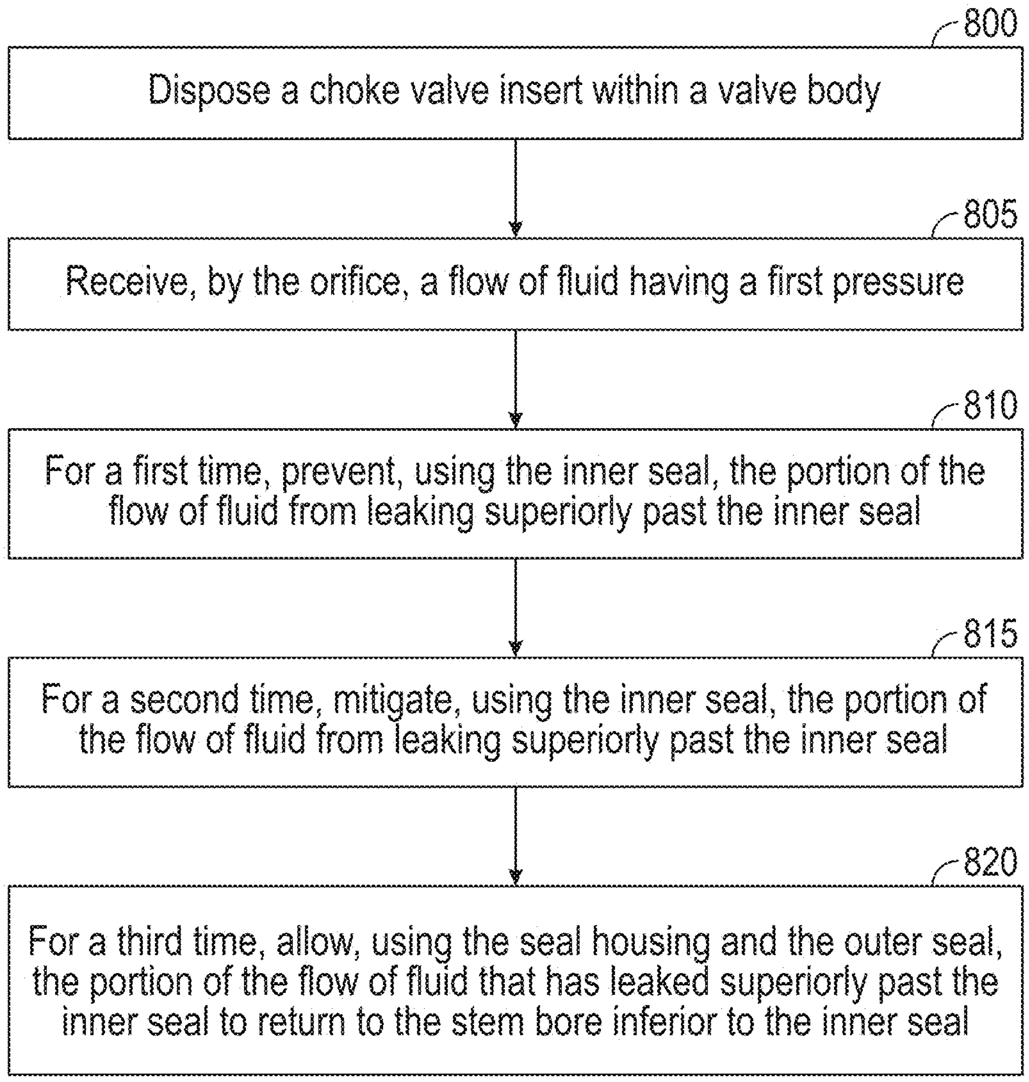
FIG. 8 describes a method in accordance with one or more embodiments.

FIG. 8 describes a method in accordance with one or more embodiments. Each of the steps described in FIG. 8 may be omitted or repeated. Further, the steps described in FIG. 8 may be rearranged without departing from the scope of the disclosure.

In step 800, a choke valve insert 105 with disclosed seal assembly 235 is disposed within a valve body 110 to form a choke valve 100.

In step 805, a flow of fluid at a first pressure is received by the orifice 240 of the choke valve insert 105. A portion of the flow of fluid migrates from the orifice 240 past the plug 220 and into the lower stem bore 245*a*.

In step 810, during a first time, the inner seal 270 is configured to form a first seal with the valve stem 225 to prevent the portion of the fluid from leaking superiorly past the inner seal 270. In some embodiments, the outer seal 280 is configured to form a second seal with the bonnet 215.

In step 815, during a second time, the inner seal 270 mitigates or allows the portion of the flow of fluid from leaking superiorly past the inner seal 270. Accordingly, during the second time, the inner seal 270 fails to form the first seal either intermittently or continuously. In some embodiments, this occurs when the choke valve insert 105 experiences vibrations or other unwanted effects caused by the harsh environment the choke valve insert 105 is operating within. In some embodiments, the outer seal 280 may continue to form the second seal or may intermittently or continuously fail to form the second seal.

In step 820, during a third time, the seal housing 275 and outer seal 280 allow the portion of the flow of fluid that has leaked superiorly past the inner seal 270 to return to the lower stem bore 245*a* inferior to the inner seal 270. To do so, the trapped, leaked fluid may flow across and/or through the seal housing 275, inferiorly past the outer seal 280 and through the cavity 250 of the bonnet 215, and across the seal housing 275. This third time may occur when the pressure of the flow of fluid flowing through the orifice 240 is reduced by translating the valve stem 225 and/or plug 220 out of the orifice 240. In some embodiments, during the third time, the returned, leaked fluid may further return to the flow of fluid flowing through the orifice 240. Further, in some embodiments, the inner seal 270 may also aid in returning the trapped, leaked fluid to the lower stem bore 245*a* inferior to the inner seal 270.

In summary, a seal assembly 235 and method of using the same are disclosed herein. Advantageously, the seal assembly 235 may provide a path for fluid that has migrated into a lower stem bore 245*a* and leaked past an inner seal 270 that is now trapped to return to the lower stem bore 245*a* inferior to the inner seal 270 and, in some embodiments, return to the main flow of fluid flowing through an orifice 240 of a choke valve insert 105.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A choke valve insert comprising:
a cage having an orifice,
wherein the orifice is configured to receive a flow of fluid;
a bonnet disposed, at least in part, superior to the cage,
wherein the bonnet has a stem bore and a cavity;
a valve stem disposed, at least in part, within the stem bore and translatable into and out of the orifice,
wherein the valve stem is configured to regulate the flow of fluid; and
a seal assembly disposed within the cavity and around the stem bore,
wherein the seal assembly comprises:
a seal housing having an inner slot, an outer slot, and a channel;
an inner seal disposed, at least in part, within the inner slot and configured to form a first seal with the valve stem to prevent a portion of the flow of fluid from leaking superiorly past the inner seal; and
an outer seal disposed, at least in part, within the outer slot and configured to form a second seal with the bonnet,
wherein the outer seal is further configured to allow the portion of the flow of fluid that has leaked superiorly past the inner seal to return to the stem bore inferior to the inner seal when the inner seal fails to form the first seal.

2. The choke valve insert of claim 1, wherein the inner seal is configured to mitigate the portion of the flow of fluid from leaking superiorly past the inner seal when the inner seal fails to form the first seal.

3. The choke valve insert of claim 1, wherein the outer seal is configured to allow the portion of the flow of fluid that has leaked superiorly past the inner seal to return to the stem bore inferior to the inner seal when a pressure of the flow of fluid decreases.

4. The choke valve insert of claim 3, wherein the portion of the flow of fluid that has returned to the stem bore inferior to the inner seal further returns to the orifice.

5. The choke valve insert of claim 1,
wherein the portion of the flow of fluid that has leaked superiorly past the inner seal passes through the channel and into the cavity prior to returning to the stem bore inferior to the inner seal.

6. The choke valve insert of claim 1, wherein the seal assembly further comprises a dampener disposed, at least in part, within the outer slot and is configured to dampen a vibration.

7. The choke valve insert of claim 1, wherein the choke valve insert is disposed within a valve body.

8. A method comprising:
disposing a choke valve insert within a valve body,
wherein the choke valve insert comprises:
a cage having an orifice,
a bonnet disposed, at least in part, superior to the cage,
wherein the bonnet has a stem bore and a cavity,
a valve stem disposed, at least in part, within the stem bore and translatable into and out of the orifice, and
a seal assembly disposed within the cavity and around the stem bore,
wherein the seal assembly comprises:
a seal housing having an inner slot, an outer slot, and a channel,
an inner seal disposed, at least in part, within the inner slot and configured to form a first seal with the valve stem; and
an outer seal disposed, at least in part, within the outer slot and configured to form a second seal with the bonnet,
receiving, by the orifice, a flow of fluid having a first pressure,
wherein a portion of the flow of fluid migrates from the orifice into the stem bore;
for a first time, preventing, using the inner seal, the portion of the flow of fluid from leaking superiorly past the inner seal;
for a second time, mitigating, using the inner seal, the portion of the flow of fluid from leaking superiorly past the inner seal; and
for a third time, allowing, using the seal housing and the outer seal, the portion of the flow of fluid that has leaked superiorly past the inner seal to return to the stem bore inferior to the inner seal.

9. The method of claim 8, wherein receiving the flow of fluid comprises translating the valve stem into or out of the orifice to regulate the flow of fluid.

10. The method of claim 8, wherein the second time occurs when the choke valve insert vibrates.

11. The method of claim 10,
further comprising allowing the portion of the flow of fluid that has leaked superiorly past the inner seal to pass through the channel and into the cavity prior to return to the stem bore inferior to the inner seal.

12. The method of claim 8, wherein the third time occurs when the orifice receives the flow of fluid having a second pressure, and
wherein the second pressure is less than the first pressure.

13. The method of claim 8, further comprising allowing the portion of the flow of fluid that has returned to the stem bore inferior to the inner seal to further return to the orifice.

14. A seal assembly comprising:
a seal housing having an inner slot, an outer slot, and a channel;
an inner seal disposed, at least in part, within the inner slot and configured to form a first seal with an inner member to prevent a flow of fluid inferior to the inner seal from leaking superiorly past the inner seal; and an outer seal disposed, at least in part, within the outer slot and configured to form a second seal with an outer member, wherein the outer seal is further configured to allow the flow of fluid that has leaked superiorly past the inner seal to return inferior to the inner seal when the inner seal fails to form the first seal.

15. The seal assembly of claim 14, wherein the inner seal comprises a UV-seal system.

16. The seal assembly of claim 15, wherein the UV-seal system comprises a UV-seal.

17. The seal assembly of claim 14, further comprising a dampener disposed, at least in part, within the outer slot and configured to dampen a vibration.

18. The seal assembly of claim 17, wherein the dampener comprises an o-ring.

19. The seal assembly of claim 17, wherein the dampener comprises an S-seal.

* * * * *